United States Patent Office 3,068,182
Patented Dec. 11, 1962

3,068,182
PREPARATION OF AMINOBORANES
William David English, Garden Grove, Howard Steinberg, Fullerton, and Allen L. McCloskey, Orange, Calif., assignors to United States Borax & Chemical Corporation, Los Angeles, Calif., a corporation of Nevada
No Drawing. Filed Aug. 24, 1959, Ser. No. 835,414
5 Claims. (Cl. 260—2)

The present invention is a continuation-in-part of our invention bearing Serial Number 745,256, dated June 30, 1958, now abandoned.

This invention relates as indicated to the preparation of aminoboranes and has particular reference to the preparation of aminoboranes and the formation of polymers by transamination.

The transamination of the present invention is based upon a metathetical reaction involving rupture of a N—B bond and a N—H bond with simultaneous formation of new N—B and N—H bonds as shown in the following reaction:

The foregoing is an equilibrium reaction and can be made to go in either direction by selection of the proper conditions.

In addition to producing monomeric aminoboranes by transamination, the present method can be used to produce polymeric aminoboranes by using a diamine and an aminoborane having at least two B—N bonds. These polymers will be found to have a molecular weight of at least about 10,000.

It is therefore the principal object of the invention to provide a new and novel method for the production of aminoboranes and the formation of polymers.

Other objects will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, the present invention comprises the method for the preparation of a compound having the formula

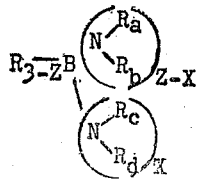

which comprises reacting a compound selected from the group consisting of aminoboranes derived from primary and secondary amines, said aminoboranes having the formula

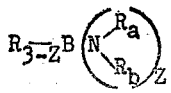

with a compound selected from the group consisting of primary and secondary amines having the formula

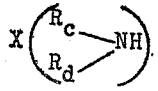

where Z is an integer from 1–3 and X≤Z; R is a substituent selected from the group consisting of alkyl, aryl, alkaryl, aralkyl, aminoalkyl, aminoaryl, aminoalkaryl and aminoaralkyl; $R_a$, $R_b$, $R_c$ and $R_d$ are substituents selected from the group consisting of hydrogen, alkyl groups having from 1–18 carbon atoms, phenyl, substituted phenyl, alkylamino and phenylamino radicals.

While it is obvious to those skilled in the art that the foregoing transamination reaction is applicable to components having structural differences, it is to be clearly understood that the present invention is also applicable to the transamination of components which have only isotopic differences. For example, the

group of the aminoborane and the

group of the amine may be structurally identical, the only difference being that the N of the latter group is an $N^{15}$ enriched isotope. By the present process the $N^{15}$ isotope can be exchanged for the N of the aminoborane.

Additionally the foregoing transamination reaction readily lends itself to the formation of polymers. Thus by transamination of a bis or tris(alkylamino)borane or a bis or tris(phenylamino)borane with a diamine or a triamine, a polymeric product is obtained. The following equation is illustrative of such reaction:

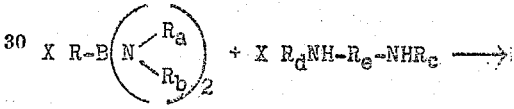

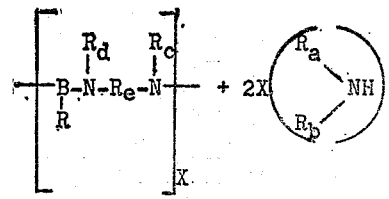

where X is the quantity of ingredients; R is a substituents; R is a substituent selected from the group consisting of alkyl, aryl, alkaryl, aralkyl, aminoalkyl, aminoaryl, aminoalkaryl and aminoaralkyl radicals, $R_a$, $R_b$, $R_c$ and $R_d$ are substituents selected from the group consisting of hydrogen, alkyl group having from 1–18 carbon atoms, phenyl, substituted phenyl, alkylamino and phenylamino radicals, and $R_e$ is a substituent selected from the group consisting of alkylene and phenylene radicals.

Still further the present process provides for the formation of homopolymers by the transamination of an alkyl-(alkylamino)aminoalkylborane as shown by the equation:

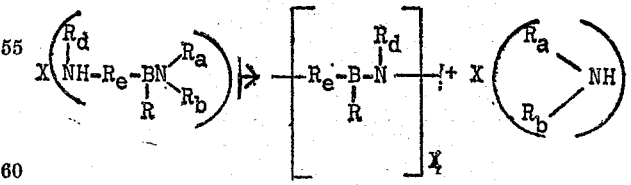

where X is the quantity of ingredients; and R, $R_a$, $R_b$, $R_d$ and $R_e$ are the same as above.

The following list is an illustrative sample of the many primary and secondary amines and aminoboranes derived from primary and secondary amines which are useful in the present invention:

A. *Primary Amines*

(1) Methylamine
(2) Ethylamine
(3) n-Propylamine
(4) Isopropylamine

3

(5) n-Butylamine
(6) Sec-butylamine
(7) Tert-butylamine
(8) Isobutylamine
(9) Amylamine
(10) Sec-amylamine
(11) Tert-amylamine
(12) Hexylamine
(13) Sec-hexylamine
(14) Tert-hexylamine
(15) Aniline
(16) Aminopyridine
(17) Aminothiophene B. *Secondary Amines*

(1) Dimethylamine
(2) Diethylamine
(3) Di-n-propylamine
(4) Di-isopropylamine
(5) Di-n-butylamine
(6) Di-sec-butylamine
(7) Di-tert-butylamine
(8) Di-isobutylamine
(9) Diamylamine
(10) Di-sec-amylamine
(11) Di-tert-amylamine
(12) Dihexylamine
(13) Di-sec-hexylamine
(14) Di-tert-hexylamine
(15) Pyrroline
(16) Diphenylamine
(17) Dipyridylamine
(18) Dithiophenylamine C. *Primary Aminoboranes*

(1) Tris(methylamino)borane
(2) Tris(ethylamino)borane
(3) Tris(n-propylamino)borane
(4) Tris(isopropylamino)borane
(5) Tris(n-butylamino)borane
(6) Tris(sec-butylamino)borane
(7) Tris(tert-butylamino)borane
(8) Tris(isobutylamino)borane
(9) Tris(amylamino)borane
(10) Tris(sec-amylamino)borane
(11) Tris(tert-amylamino)borane
(12) Tris(hexylamino)borane
(13) Tris(sec-hexylamino)borane
(14) Tris(tert-hexylamino)borane
(15) Tris(anilino)borane
(16) Tris(pyridylamino)borane
(17) Tris(thiophenylamino)borane D. *Secondary Aminoboranes*

(1) Tris(dimethylamino)borane
(2) Tris(diethylamino)borane
(3) Tris(di-n-propylamino)borane
(4) Tris(di-isopropylamino)borane
(5) Tris(di-n-butylamino)borane
(6) Tris(di-sec-butylamino)borane
(7) Tris(di-tert-butylamino)borane
(8) Tris(di-isobutylamino)borane
(9) Tris(diamylamino)borane
(10) Tris(di-sec-amylamino)borane
(11) Tris(di-tert-amylamino)borane
(12) Tris(dihexylamino)borane
(13) Tris(di-sec-hexylamino)borane
(14) Tris(di-tert-hexylamino)borane
(15) Tris(pyrrolo)borane
(16) Tris(diphenylamino)borane
(17) Tris(dipyridylamino)borane
(18) Tris(dithiophenylamino)borane E. *Mixed Secondary Amines*

(1) Methylethylamine
(2) Methylisopropylamine

4

(3) Allylmethylamine
(4) N-methylaniline
(5) N-isopropylaniline

F. *Secondary Aminoboranes*

(1) Tris(methylethylamino)borane
(2) Tris(methylisopropylamino)borane
(3) Tris(allylmethylamino)borane
(4) Tris(N-methylanilino)borane
(5) Tris(N-isopropylanilino)borane The following examples illustrate in detail the present transamination reaction and are not to be considered as limitative.

(I)

Into a flask were placed 50 parts by weight of secondary butylamine and 42 parts by weight of tris(isopropylamino)borane. The ingredients were mixed and heated at reflux until no more isopropylamino evolved. The flask was then cooled and the mixture was distilled under reduced pressure. The yield was 39 parts by weight of tris(sec-butylamino)borane which had a B.P. of 134–136° C. at 47 mm. pressure, a refractive index of $n_d^{24}$ 1.4324 and contained 4.78% B.

(II)

Tris(isopropylamino)borane (50 parts by weight) and melamine [$N_3C_3(NH_2)_3$] (34 parts by weight) were heated together at reflux in a flask until no liquid remained in the flask. The residue was 41 parts by weight of a yellow solid high polymer which had extremely high thermal stability.

(III)

A flask containing 50 parts by weight of n-butylamine and 42 parts by weight of tris(isopropylamino)borane was heated at reflux until the isopropylamine was completely evolved. The reaction mixture was distilled under reduced pressure to yield 5 parts by weight of tris(n-butylamino)borane having a B.P. of 105–106° C. at 1 mm. pressure, a refractive index of $n_d^{25}$ 1.4438 and a B content of 4.74%.

(IV)

Piperidine and tris(isoproplyamino)borane (75 and 36 parts by weight, respectively), were heated together at reflux in a flask until no more isopropylamine distilled out. The reaction mixture was then distilled under reduced pressure to yield 46 parts by weight of tris(piperidino)borane having a B.P. of 134–149° C. at 1 mm. pressure and contained 4.49% B.

(V)

A flask containing 60 parts by weight of aniline and 40 parts by weight of tris(t-butylamino)borane was heated at reflux until t-butylamine was no longer evolved. Cooling the reaction mixture to room temperature caused it to solidify. The solid was broken up and washed with methylene chloride, xylene and pentane to remove soluble impurities. The remaining white crystals were dried in a vacuum oven. The product was 46 parts by weight of tris(anilino)borane.

(VI)

A flask containing 32 parts by weight of tris(sec-butylamino)borane was heated at reflux on a steam bath. The flask was connected to a steam-jacketed reflux condenser and a gas-inlet tube which extended below the surface of the amino-borane. Gaseous methylamine was bubbled through the liquid until there was no further change in volume. The reaction mixture was then distilled to yield 6 parts by weight of tris(methylamino)borane having a B.P. of 70–80° C. at 48 mm. pressure and refractive index of $n_d^{25}$ 1.4432.

(VII)

A mixture of 50 parts by weight of n-hexylamine and 30 parts by weight of tris(diethylamino)borane were heated at reflux in a flask until evolution of diethylamine ceased. The resultant reaction mass was then heated under reduced pressure until all excess of n-hexylamine was removed.

The resultant product tris(n-hexylamino)borane, 31 parts by weight, was a yellow oil which could not be distilled at 1 mm. pressure and had a refractive index of $n_d^{25}$ 1.4549.

(VIII)

A mixture of 31 parts by weight of piperidine and 14 parts by weight of B-tris(isopropylamino)N-tris-isopropylborazole were heated together at reflux in a flask. The heating was continued until the evolution of isopropylamine ceased. The residue was then distilled to yield 20 parts by weight of tris(piperidino)borane.

(IX)

A solution was made from 2.8 parts by weight of hexamethylenediamine and 5.6 parts by weight of phenylbis-(tertiary butylamino)borane in 50 parts by weight of xylene. The solution was heated at reflux until evolution of tertiary butylamine ceased. The residue was concentrated under reduced pressure to yield a thermoplastic resin.

(X)

A mixture of 16.2 parts by weight of p-phenylenediamine and 22.7 parts by weight of tris(n-butylamino)borane was heated at reflux under reduced pressure (30 mm.) until evolution of n-butylamine ceased. The residue was a clear, brittle resin which did not melt at 300° C.

(XI)

Phenylhydrazine (50 parts by weight) and 30 parts by weight of tris(diethylamino)borane were heated together at reflux until diethylamine was completely driven out. The residue was recrystallized in xylene to yield 40 parts by weight of tris(phenylhydrazino)borane.

(XII)

A mixture of 20 parts by weight of hexamethylborazole and 30 parts by weight of n-butylamine were heated at reflux until methylamine was completely expelled. Distillation of the residue gave a yield of 20 parts by weight of methylbis(n-butylamino)borane which contained 6.5% boron.

(XIII)

A solution of 14 parts by weight of tris(anilino)borane and 40 parts by weight of stearylamine in 100 parts of trichlorobenzene was heated at reflux under reduced pressure (100 mm. of Hg) until the evolution of aniline ceased. Upon cooling, tris(stearylamino)borane crystallized out. After recrystallization from trichlorobenzene, 35 parts by weight of white solid product were obtained.

(XIV)

Phenyldimethylaminoborane was reacted with allylmethylamine to produce 2,7-diaza-3-bora-2-methyl-3-phenyloctane.

The above product on heating in refluxing di-n-hexyl ether eliminated dimethylamine and formed a polymeric substance which was partially soluble in the ether used. However, on the addition of 20–40° C. petroleum ether the polymer precipitated out of solution.

The molecular weight of the homopolymer formed by the heating of the above 2,7-diaza-3-bora-2-methyl-3-phenyloctane had a molecular weight in excess of 15,000 as determined by the isotensiscope with dimethylformamide as the solvent.

The reactions demonstrated in the foregoing examples can be carried out with or without the presence of a solvent. When the reactions are conducted in the presence of a solvent the heating of the reactants is carried out at the reflux temperature of the solvent; when no solvent is present reflux is carried out at the boiling temperature of the lowest boiling reactant.

Th transamination process of the present invention provides a new and novel means for producing new monomeric and polymeric aminoboranes heretofore unattainable by the known prior art methods.

The monomers produced by the present transamination process are useful as chemical intermediates for the production of various organoboron compounds and have particular value in the production of thermally stable polymers. The present monomers will also be found to have utility as antisludging agents in lubricating oils and diesel fuels.

The polymers produced according to the present invention can be either thermosetting or thermoplastic. By reacting a trifunctional amine such as melamine with a tris(alkylamino)borane a cross-linked polymer is produced which is thermosetting. The present polymers can be used in the production of thermally stable films, they can be cast, extruded and molded, and they will also be found useful as electrical insulating coatings for withstanding high temperatures.

Other modes of applying the principle of the invention may be employed, change being made as regards the details described, provided the features stated in any of the following claims or the equivalent of such be employed.

We, therefore, particularly point out and distinctly claim as our invention:

1. The transamination reaction for the production of a polymer having as the sole recurring structural unit

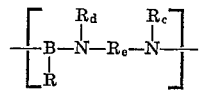

wherein R is a substituent selected from the group consisting of alkyl, aryl, alkaryl, aralkyl, aminoalkyl, aminoaryl, aminoalkaryl and aminoaralkyl radicals; $R_c$ and $R_d$ are substituents selected from the group consisting of hydrogen, alkyl groups having from 1–18 carbon atoms, phenyl, substituted phenyl, alkylamino and phenylamino radicals, $R_e$ is a substituent selected from the group consisting of alkylene and phenylene radicals, which comprises reacting a compound selected from the group consisting of bis(alkylamino)boranes, tris(alkylamino)boranes, bis(phenylamino)boranes and tris(phenylamino)boranes with a compound selected from the group consisting of alkyldiamines having primary amino groups, alkyldiamines having secondary amino groups, alkyltriamines having primary amino groups, alkyltriamines having secondary amino groups, phenyldiamines having primary amino groups, phenyldiamines having secondary amino groups, phenyltriamines having primary amino groups, phenyltriamines having secondary amino groups, mixed alkyl-phenyl diamines and aminotriazines.

2. The transamination reaction for the production of a homopolymer having as the sole recurring structural unit

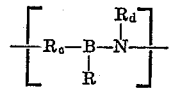

wherein R is a substituent selected from the group consisting of alkyl, aryl, alkaryl, aralkyl, aminoalkyl, aminoaryl, aminoalkaryl and aminoaralkyl radicals; and $R_c$ and $R_e$ are substituents selected from the group consisting of hydrogen, alkyl groups having from 1–18 carbon atoms, phenyl, substituted phenyl, alkylamino and phenylamino radicals; which comprises heating an alkyl (alkylamino)aminoalkylborane.

3. As a new composition of matter, the polymer from the transamination reaction between melamine and tris(isopropylamino)borane.

4. As a new composition of matter, tris(phenylhydrazino)borane.

5. A transamination reaction which comprises heating under reflux an amine selected from the group consisting of $RNH_2$, $RR^1NH$ and $R^5NH$ with a boron-nitrogen bonded compound selected from the group consisting of $R_2BNR^2R^3$, $RB(NR^2R^3)_2$, $B(NR^2R^3)_3$, $B(NR^5)_3$, $(R^2R^3NBNR^4)$ and $(RBNR^2)_3$ where from one to three of the organoamino groups of said boron-nitrogen bonded compounds are displaced with from one to three organoamino groups of said amine compounds, where $R$, $R^1$, $R^2$ and $R^4$ are radicals selected from the group consisting of alkyls of from 1–18 carbon atoms, phenyl, alkyl substituted phenyl said alkyl substituents having from 1–18 carbon atoms, pyridyl and thienyl, $R^3$ is selected from the group consisting of hydrogen, alkyls of from 1–18 carbon atoms, phenyl, alkyl substituted phenyl said alkyl substituents having from 1–18 carbon atoms, pyridyl and thienyl and $R^5$ is a polymethylene of from 3–8 carbon atoms.

References Cited in the file of this patent

UNITED STATES PATENTS

| | | |
|---|---|---|
| 2,517,944 | Upson | Aug. 8, 1950 |
| 2,754,177 | Gould | July 10, 1956 |
| 2,809,171 | Hough et al. | Oct. 8, 1957 |

OTHER REFERENCES

Lappert: Chemical Reviews, vol. 56, page 1039 1956).

Darnow et al.: Angewandte Chemi, vol. 68, page 619 1956).

Darnow et al.: Zeitschrift für Anorganische und Allgemeine Chemi, vol. 294, pages 81–91 (1958).

Mikhailov et al.: Chemical Abstracts, vol. 53, page 1209, Jan. 25, 1959.

Bellamy et al.: Journal Chemical Society, pages 2412–5 (1958).

Lappert: Proc. of the Chemical Society (London), February 1959, page 59.

UNITED STATES PATENT OFFICE
CERTIFICATE OF CORRECTION

Patent No. 3,068,182            December 11, 1962

William David English et al.

It is hereby certified that error appears in the above numbered patent requiring correction and that the said Letters Patent should read as corrected below.

Column 2, line 41, strike out "R is a substituents;"; column 4, line 5, after "F." insert -- Mixed --, in italics; column 6, line 65, for "$R_e$" read -- $R_d$ --.

Signed and sealed this 21st day of May 1963.

(SEAL)
Attest:

ERNEST W. SWIDER
Attesting Officer

DAVID L. LADD
Commissioner of Patents